Patented Feb. 9, 1932

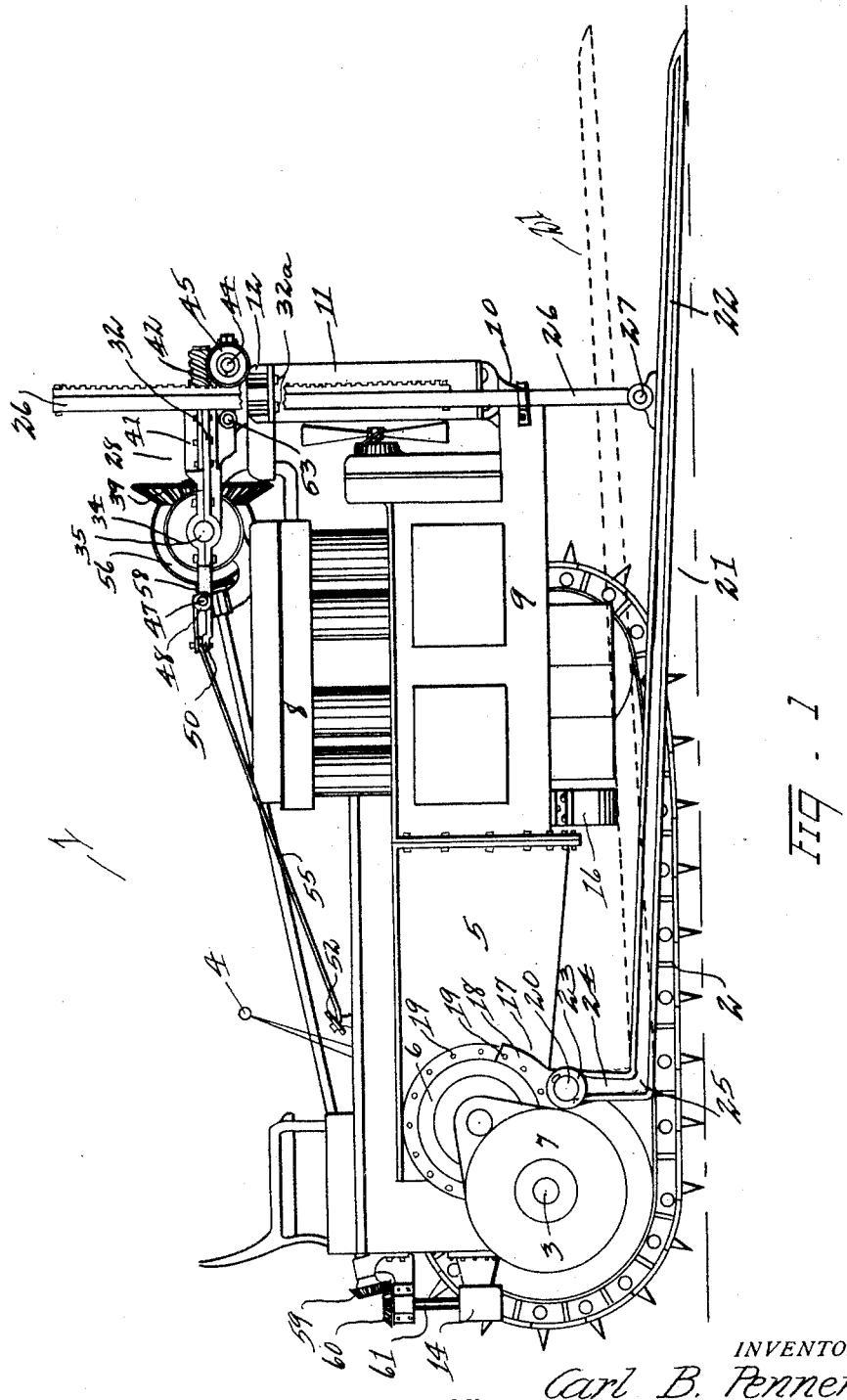

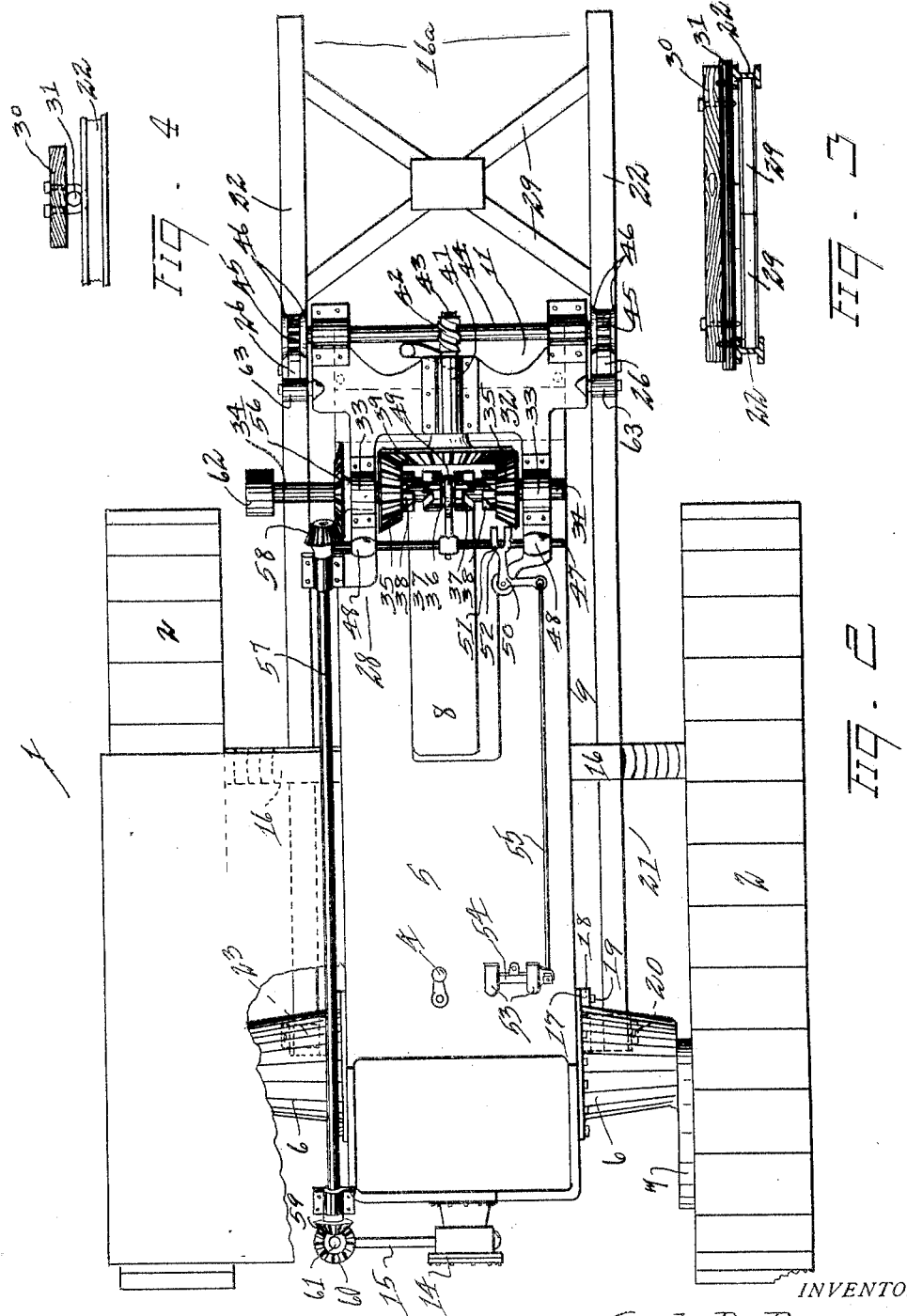

1,844,524

UNITED STATES PATENT OFFICE

CARL B. PENNER, OF STARBUCK, WASHINGTON

POWER TRUCK ATTACHMENT FOR TRACTORS

Application filed March 17, 1930. Serial No. 436,456.

This invention relates to power truck attachments for tractors, and has as one of its objects to provide an attachment for tractors, formed integral therewith and operable by power generated by the tractor engine.

Another object of the invention is to provide a means by which heavy loads may be transported and supported by a tractor frame and traction mechanism.

A further object of the invention is to provide an attachment for tractors whereby machinery may be carried, transported and operated by a tractor.

A further object of the invention is to provide a power truck attachment for tractors that is operable in a vertical plane.

A further object of the invention is to provide a power truck attachment for tractors that may be readily and operably connected with transportable machines.

A further object of the invention is to provide a power truck attachment for tractors that is adapted for remote control.

A further object of the invention is to provide a power truck attachment for tractors that will carry farm implements or the like as an attachment for effective operation in fence corners and near ravines or other obstacles.

A further object of the invention is to provide a power truck attachment for tractors for the operation and transportation of of power driven machinery and which will provide for a selective speed for the machinery irrespective of the ground speed of the tractor.

A further object of the invention is to provide a power truck attachment for tractors and providing for a readily available power take-off associated with said truck attachment.

A further object of the invention is to provide a combined power truck attachment and power take-off, for tractors, for the simultaneous operation and supporting at different heights of power driven machinery thereby.

A further object of the invention is to provide a power truck attachment for tractors that is substantial in construction, comparatively cheap to manufacture and that is highly efficient.

With these and other objects in view, reference is now had to the accompanying drawings, in which Fig. 1 is a side elevation of a tractor with its near track removed to show the application of the device as applied to a tractor;

Fig. 2 is a plan view of a tractor, showing the device as applied thereto;

Fig. 3 is a front elevation of the truck showing the application of a superplatform attached thereto, and Fig. 4 is an end view thereof.

Having reference to the drawings, like numerals refer to like parts throughout the several views, and the numeral 1 refers to the tractor as a whole, which consists of a pair of self laying tracks 2 operably mounted on an axle 3 which axle is rotated through the medium of the usual transmission gears and controlled by an operating lever 4, the transmission gears being contained in a transmission housing 5 to which housing clutch housings 6 are securely bolted or otherwise rigidly attached on either side thereof, and this housing 6 communicates and is formed integral with a gear housing 7 containing the said axle and gears and clutches to drive that member, which gears and clutches are not shown as they contain no part in this invention and as they are old in the art.

Rigidly secured to the transmission housing and extended forward thereof is a power plant 8 represented herein as a gasoline engine of the internal combustion type, which engine is supported by substantial side frames 9, which frames are extended forward and are provided at their forward ends with a shelf member 10 upon which is secured the radiator 11 of the engine, and this radiator is completed with a cap 12 that is secured thereto by means of bolts, by which massive construction a firm foundation is established for a purpose to be explained.

Securely and removably attached to the rear end of the tractor is a power take-off 14 provided with a laterally extending shaft 15 to be driven by the mechanism within the tractor and under control of the said lever in a manner that a fixed velocity of this shaft is obtained that is proportionate to the speed of the driving mechanism at all times.

The forward end of the tractor is supported by a spring member 16 that rests well forward on the track, as shown, and this member is constructed so that its highermost part is adjacent to the side frames while its lowermost part rests upon the tracks to support the tractor as above mentioned, and the tracks are spaced apart from the side frames 9 to provide a tread of proper width and also to provide ample room between the said tracks and side frames for a truck 16a which will now be explained.

The truck consists of pivot members 17 attached in any suitable manner to one end of the tractor, and these members consist preferably of curved plates 18 adapted to be bolted to the transmission housing and over the flange of the clutch housing, utilizing the flange bolts 19 for the purpose of securement.

While these members are shown and described as being thus positioned and attached, obviously any method and means may be used for this purpose without effecting the scope of the invention, and these plates include a substantial pivot 20 which provides a fulcrum for a lever 21 of the third class, which lever consists of arms 22 having a bearing 23 at one end adapted for pivotal engagement with the said pivot and provided with a depending section 24 having a bend 25 terminating this section to bring the arm comparatively close to the ground as shown and to extend the arm forward past the front end of the machine to where it may contact the ground with a slight angle thereto, as shown in Fig. 1, whereby these arms which constitute the said truck may be forced under a load in the usual manner of trucks for a purpose to be explained.

Obviously with the arms so attached to the tractor, they become integral with the machine, and hence are transportable therewith, whereby a load mounted on said truck may be moved from place to place with said tractor.

While the arms are shown extended past the front end of the tractor, obviously their position may be reversed if desired without departing from the spirit of the invention, however the device positioned as shown is my preferred form and this form will now be explained.

The purpose of the pivot 20 is to provide for movement of the truck at its outer end, and in a vertical plane, and for that purpose the arms will preferably be positioned between the tracks and the body of the tractor, and when so positioned will operate in their vertical movement beneath the said spring member, and thus the spring member normally must be considered through its curvature (not shown) to permit movement of the side arms to the position shown by the dotted lines in Fig. 1, which position will be termed the normal carrying position of the truck, with a further raising being permitted by the said curvature of the spring member. Obviously these arms may be bent in a manner not shown to avoid this member whereby to increase the range of movement of the said arms if deemed advisable.

To complete the lever of the third class and also to raise and lower the lever, supporting racks 26 are attached to the said arms by means of a hinge 27 riveted or otherwise securely attached to the arm, and these upright supporting racks preferably occur at points opposite to and on either side of the said radiator for movement vertically by a power operating means 28 which will be presently explained.

The front end of the truck will form a platform and for this purpose cross braces 29 may be secured therein ahead of the tractor to provide integral braces therefor, which braces together with the securement of the rear ends of the arms to the pivotal members will provide ample bracing for the said truck.

For picking up or transporting loads that may remain stationary upon the truck during transportation, the platform may be considered as being complete as shown, however as one of the objects is to carry machinery that depends for its operation successfully by providing a tilting movement thereto during transportation, a super platform 30 is provided that may be removably and rockably attached to the said platform, and this super platform will consist preferably of a transverse shaft 31 movably secured to both arms of the truck on the upper side thereof, to which shaft is also rockably secured a second and preferably a relatively smaller platform by which a rocking movement to that member may be obtained if desired.

To operate said truck with a vertical movement the power operating means 28 is provided that is securely mounted upon the tractor in operable adjacency with the said vertically positioned racks and this operating means consists of a frame structure 32 which in this case is secured to the tractor by means of bolts 32a passed through this said structure and adapted to be used in place of the original bolts that secured the head of the radiator into place on the radiator, which radiator then forms a support for the said power operating means, the radiator being in turn supported by the extended portion of the said side frames 9, and while this shows one method of attaching the said operating means to the tractor, obviously other means may be employed for a like purpose.

The frame structure is constructed to provide a series of bearings, two of which bearings 33 being adapted to journal a laterally extended power shaft 34, one end of which is projected beyond the side of the tractor for a purpose to be explained.

On this shaft and between the said bearings are mounted preferably a pair of oppositely positioned spur pinions 35 idly mounted thereon and between the spur pinions and slidably mounted on the said shaft is a clutch collar 36 adapted for rotation with said shaft by means of a feather key (not shown), and this clutch collar has dogs 37 provided at each end thereof adapted to register with and alternately engage corresponding dogs 38 formed integral with the respective pinions thus forming a clutch mechanism adapted to control the movement of said racks through the medium of a bevel gear 39 positioned perpendicular to the said power shaft and in constant engagement with both of said pinions, and this gear is supported by a shaft extended forwardly through a bearing 41 positioned on the frame structure for the purpose, and provided on its extreme forward end with a worm 42 which worm is adapted to engage a worm gear 43 attached to a cross shaft 44 which is likewise journalled in the said structure and which extending laterally, is provided with spur pinions 45 having shrouds 46 adapted for positioning on each side of the rack to prevent lateral movement thereof, and with the teeth of the pinions engaging the teeth of said racks.

It is a well known fact that the smaller the pitch of worm gears positioned at right angles, the greater the frictional resistance of the worm, and this fact is taken advantage of to provide an automatic resistance that will resist the weight of the load, thus maintaining the load at a desired elevation when the clutch is disengaged.

To operate the clutch collar 36 slidably on the power shaft 34, a sliding shaft 47 is slidably mounted in the frame in the bearings 48 provided for the purpose, and a yoke 49 is rigidly secured on said shaft to register with and operate said collar into or out of engagement with the respective idle pinions, and to operate this shaft in a lateral direction for the purpose a bell crank 50 is provided pivotally supported by the frame structure and having at one end a U shaped means 51 that engages a pin 52 set into the said shaft whereby upon operation of the bell crank upon its pivot, the clutch may be moved into or out of engagement with either of said pinions.

As it is desirable that operation of this clutch should be from a place similar to the place of other controls and as this place is remote from the said clutch, an operating means is positioned at a desirable place before the seat of the operator, and this operating means consists of a pair of treads 53 joined together by a cross member 54, which cross member is pivoted in a manner to provide a rocking movement of the treads in a horizontal plane whereby to advance or retract a connecting rod 55, one end of which is connected with the cross member and the other end is connected to the other arm of said bell crank, whereby, upon the rocking of this control, the clutch may be operated from a remote distance.

To drive the power shaft for the purpose of operating the truck in a vertical plane, a main drive gear 56 is rigidly attached to the said power shaft, a line shaft 57 having one end journalled in the frame structure and its other end journalled at the rear of the tractor is provided with pinions at each end, one of which pinions 58 engages the main drive gear while the other one 59 engages a similar pinion 60 secured upon a vertical shaft 61 and preferably journalled in the same bearing structure as its complemental pinion, this vertical shaft in turn being suitably connected with the transverse shaft 15 that is operable by the power take-off.

It is now obvious that as the power take-off is driven from the internal mechanism of the tractor and has a controlling means at the hand of the operator, that control of the speed of the operating mechanism for the truck will be directly under the supervision of the operator at all times and it will be further noted, that by the addition of a pulley 62 to the power shaft, that a power take-off is provided that will act as a substitute take-off for the original power take-off, and that this substitute take-off is operably positioned in cooperable adjacency to the said truck whereby to provide power to operate any machine capable of being carried on the said truck.

It will now be noted that a substitute take-off is provided that is operable independent of the power operating means of said truck and hence, assuming a binder being carried by said truck for operation in advance of a tractor, that the binder may be driven by the said power take-off; that should tough straw be encountered, that by changing the gears of the internal mechanism of the tractor to intermediate or low (using the common terms therefor) that the speed of the tractor over the ground will be reduced, while the speed of the take-off and consequently the speed of said machine carried by the truck increased with a highly efficient effect, and, should it be desirable to raise or lower the said binder or other machine for more efficient operation, that the operator may also control the height to which the said machine will be positioned that is best adapted for the work in hand, and further it will be noted that in the operation of the substitute take-off or the operation of the operating means that one will in nowise effect the other, as the operation of each is entirely independent, even though forming a single unit, and further, that by the use of the super platform the machine carried by the said truck may be positioned thereon at an angle suitable to the work at hand.

In use the machine may be driven up to a load and the truck forced under that load by the traction of the track of the tractor, when by suitable manipulation the truck may be raised and the load transported to its destination, or in the event of a machine, as for instance a wood saw being used, this machine may be placed upon the truck and raised to a height most convenient for the size of the log to be cut.

While a pulley is shown on the power shaft it must here be understood that a tumbling rod, which is old in the art and hence not shown, will be used in preference to a belt or other means of operably connecting the substitute take-off with the carried machine; and to maintain the racks in constant engagement with their respective pinions during operation, a pair of rollers 63 are provided, journalled in the said frame structure and directly opposite the said pinions, to bear against the back of said rack for the purpose of stability.

Having thus described my invention, I claim,

1. In a power truck attachment for tractors, the combination with a tractor having a power take-off, of a pair of arms, paralleling the side frames of said tractor, and having their rear ends pivotally attached to the rear ends of said frames, and their forward ends extended ahead of said tractor to provide a truck platform, supporting racks hingedly attached to said arms, a power operating means mounted on said tractor and operably connected with said racks, and provided with a power shaft operable by and controllable with said power take-off, and provided in turn with a separate controlling means for said truck platform, said power shaft providing a substitute power take-off, and means to remotely control said power operating means.

2. In a power truck attachment for tractors, the combination with a tractor having a power take-off, of a pair of arms, paralleling the side frames of said tractor, and having their rear ends pivotally attached to the rear ends of said frames, and their forward ends extended ahead of said tractor to provide a truck platform, supporting racks hingedly attached to said arms, a power operating means mounted on said tractor and provided with a clutch controlled worm and worm gear operably connected with said racks, and provided with a power shaft operable by and controllable with said power take-off, and provided in turn with a separate controlling means for said truck platform, said power shaft providing a substitute power take-off, and means to remotely control said clutch.

3. In a power truck attachment for tractors, the combination with a tractor having a power take off, of a pivot member rigidly attached to the rear end of the side frames of said tractor, arms positioned between the respective side frames and the tracks of said tractor, and having their rear ends movably and removably mounted on said pivot members and their forward ends extended beyond the forward end of said tractor to provide a truck, a platform formed integral with said truck and adapted to provide lateral bracing for said arms, and provided with a super-platform removably and rockably attached to said platform, supporting racks hingedly attached to said arms in a manner to provide a lever of the third class, a power operating means mounted on said tractor and consisting of a frame structure adapted for securement to said tractor and provided with bearings, a laterally extended power shaft rotatably mounted in certain of said bearings, a clutch operated reversing mechanism idly associated with said power shaft and provided with a worm, a cross shaft rotatably mounted in other of said bearings and provided with pinions positioned in register with said racks, a worm wheel mounted on said cross shaft to register with said worm, said worm and worm gear having a tooth pitch adapted to frictionally resist the effect of a load on said truck, a main drive gear rigidly secured to said power shaft, means connecting said main drive gear with said power take-off, and forming a substitute take-off positioned in operable adjacency with said truck, and means to remotely operate the clutch of said power operating means independent of said substitute take-off.

In testimony whereof I have affixed my signature.

CARL B. PENNER.